US012799273B2

(12) United States Patent
Kim et al.

(10) Patent No.: US 12,799,273 B2
(45) Date of Patent: Nov. 17, 2026

(54) POLY(ETHER ESTER) COPOLYMER, AND METHOD FOR PREPARING THE SAME

(71) Applicant: LG CHEM, LTD., Seoul (KR)

(72) Inventors: Jeongnam Kim, Daejeon (KR); Mooho Hong, Daejeon (KR); Yeonji Choe, Daejeon (KR)

(73) Assignee: LG CHEM, LTD., Seoul (KR)

( * ) Notice: Subject to any disclaimer, the term of this patent is extended or adjusted under 35 U.S.C. 154(b) by 483 days.

(21) Appl. No.: 18/290,737

(22) PCT Filed: Jun. 1, 2023

(86) PCT No.: PCT/KR2023/007529

§ 371 (c)(1),
(2) Date: Jan. 19, 2024

(87) PCT Pub. No.: WO2024/122770

PCT Pub. Date: Jun. 13, 2024

(65) Prior Publication Data

US 2025/0101169 A1 Mar. 27, 2025

(30) Foreign Application Priority Data

Dec. 6, 2022 (KR) ........................ 10-2022-0168705

(51) Int. Cl.
*C08G 63/672* (2006.01)
*C08G 63/83* (2006.01)
*C08G 63/85* (2006.01)

(52) U.S. Cl.
CPC ........... *C08G 63/672* (2013.01); *C08G 63/83* (2013.01); *C08G 63/85* (2013.01)

(58) Field of Classification Search
None
See application file for complete search history.

(56) References Cited

U.S. PATENT DOCUMENTS

| | | | |
|---|---|---|---|
| 4,532,290 | A | 7/1985 | Jaquiss et al. |
| 5,436,313 | A | 7/1995 | Klang et al. |
| 5,436,314 | A | 7/1995 | Yang et al. |
| 5,569,737 | A | 10/1996 | Yang et al. |
| 5,610,205 | A | 3/1997 | Yang et al. |
| 5,902,873 | A | 5/1999 | Banach et al. |
| 2006/0177655 | A1 | 8/2006 | Mizohata et al. |
| 2009/0281271 | A1 | 11/2009 | Bruchmann et al. |
| 2020/0354511 | A1 | 11/2020 | Kim et al. |

FOREIGN PATENT DOCUMENTS

| | | | |
|---|---|---|---|
| CA | 2145919 | A1 | 10/1995 |
| CN | 101704944 | A | 5/2010 |
| CN | 1961023 | B | 5/2012 |
| CN | 102898632 | A * | 1/2013 |
| CN | 110092897 | A | 8/2019 |
| EP | 0675147 | B1 | 8/2001 |
| JP | S59-093723 | A | 5/1984 |
| JP | H0812754 | A | 1/1996 |
| JP | 2000-297143 | A | 10/2000 |
| JP | 2007-297603 | A | 11/2007 |
| JP | 2008-156453 | A | 7/2008 |
| JP | 2009-091445 | A | 4/2009 |
| JP | 2020-117575 | A | 8/2020 |
| JP | 2022-064822 | A | 4/2022 |
| KR | 10-1995-0032371 | A | 12/1995 |
| KR | 10-1183498 | B1 | 9/2012 |
| KR | 10-2019-0054507 | A | 5/2019 |
| KR | 10-2019-0060663 | A | 6/2019 |
| KR | 10-2191463 | B1 | 12/2020 |
| KR | 10-2021-0095514 | A | 8/2021 |

* cited by examiner

*Primary Examiner* — Tae H Yoon
(74) *Attorney, Agent, or Firm* — Bryan Cave Leighton Paisner LLP

(57) ABSTRACT

A poly(ether ester) copolymer including a polymer matrix containing a polyether-based repeating unit and a polyester-based repeating unit, and a mono-metallic salt of an inorganic acid and a multi-metallic salt of an inorganic acid that remain in the polymer matrix, and a method for preparing the same.

16 Claims, No Drawings

POLY(ETHER ESTER) COPOLYMER, AND METHOD FOR PREPARING THE SAME

CROSS-REFERENCE TO RELATED APPLICATION(S)

This application is a National Stage Application of International Application No. PCT/KR2023/007529 filed on Jun. 1, 2023, which claims the benefit of Korean Patent Application No. 10-2022-0168705 filed on Dec. 6, 2022 with the Korean Intellectual Property Office, the disclosure of which is herein incorporated by reference in its entirety.

TECHNICAL FIELD

The present invention relates to a poly(ether ester) copolymer that can significantly shorten a polymerization time and increase productivity, while maintaining a state of excellence in physical properties of the copolymer, and a method for preparing the same.

BACKGROUND

Thermoplastic poly(ether ester) elastomers (TPEEs) are highly functional materials having both elasticity of rubber and molding processability of plastic. TPEEs are substitutes for vulcanized rubber and PVC (polyvinyl chloride), and used in a wide variety of fields such as automobiles, home appliances, building materials, IT, articles for daily use, etc. TPEEs are represented by poly(ether ester)-based block copolymer resin compositions.

Poly(ether ester) copolymers are composed of a hard segment consisting of a diol and a dicarboxylic acid derivative and a soft segment consisting of a polyether diol and a dicarboxylic acid derivative, and have elastomeric properties. The hard segment provides mechanical properties of the elastomer, and the soft segment provides elasticity and flexibility of the elastomer.

Such thermoplastic poly(ether ester) copolymers are commercially prepared by a two-step reaction including performing an ester exchange reaction using a diol, a dicarboxylate and a polyether diol as starting materials, and then performing a polycondensation reaction of the reaction product.

As an example, polybutylene terephthalate (PBT)-poly (tetramethylene ether glycol) (PTMG) copolymer, which is one of the well-known TPEEs, is prepared through an ester exchange reaction and a polycondensation reaction using 1,4-butylene glycol (BG), dimethyl terephthalate (DMT) and PTMG as starting materials.

Meanwhile, in the polycondensation step, a cocatalyst can be additionally applied in addition to the main catalyst to improve productivity, and alkali metallic salts or alkaline earth metallic salts such as Na acetate, Mg acetate, and Ca acetate have been mainly used as such cocatalysts.

However, in processes using existing cocatalysts, there was an aspect unsuitable for mass production because it is difficult to sufficiently shorten the polymerization time and the productivity is still low.

Therefore, there is a need to provide a method for preparing a poly(ether ester) copolymer that can sufficiently shorten the polymerization time so as to be suitable for mass production, while preparing a poly(ether ester) copolymer maintaining thermal and mechanical properties of a level equivalent to conventional ones.

BRIEF DESCRIPTION

Technical Problem

It is an object of the present invention to provide a poly(ether ester) copolymer that can significantly shorten a polymerization time and increase productivity, while maintaining a state of excellence in physical properties of the copolymer.

It is another object of the present invention to provide a method for preparing the poly(ether ester) copolymer.

Technical Solution

In order to achieve the above objects, provided herein is a poly(ether ester) copolymer comprising: a polymer matrix containing a polyether-based repeating unit and a polyester-based repeating unit, and a mono-metallic salt of an inorganic acid and a multi-metallic salt of an inorganic acid that remain in the polymer matrix.

Also provided herein is a method for preparing a poly (ether ester) copolymer, comprising the steps of: a) an esterification reaction step of reacting a diol, a dicarboxylic acid or a derivative thereof, and a polyether diol in the presence of a catalyst and a cocatalyst: b) a first polycondensation step of introducing the catalyst to the reaction mixture after the step a) is completed and performing polycondensation under reduced pressure to prepare a prepolymer; and c) a second polycondensation step of performing polycondensation of the prepolymer under a lower pressure condition than that of the step b), wherein the cocatalyst includes a mono-metallic salt of an inorganic acid and a multi-metallic salt of an inorganic acid.

DETAILED DESCRIPTION

Now, a poly(ether ester) copolymer and a method for preparing the same according to specific embodiments of the invention will be described in more detail.

Unless explicitly stated herein, the technical terms used herein are for the purpose of describing specific embodiments only and is not intended to limit the scope of the invention.

The singular forms "a," "an" and "the" used herein are intended to include plural forms, unless the context clearly indicates otherwise.

It should be understood that the terms "comprise," "include", "have", etc. are used herein to specify the presence of stated feature, region, integer, step, action, element and/or component, but do not preclude the presence or addition of one or more other feature, region, integer, step, action, element, component and/or group.

Further, the terms including ordinal numbers such as "a first", "a second", etc. are used only for the purpose of distinguishing one component from another component, and are not limited by the ordinal numbers. For instance, a first component can be referred to as a second component, or similarly, the second component can be referred to as the first component, without departing from the scope of the present invention.

In the present disclosure, examples of the substituent groups are described below, but is not limited thereto.

As used herein, the term "substituted" means that another functional group bonds instead of a hydrogen atom in the compound, and a position to be substituted is not limited as long as it is a position at which the hydrogen atom is substituted, namely, a position at which it is substitutable with the substituent. When two or more substituents are substituted, the two or more substituents can be identical to or different from each other.

As used herein, the term "substituted or unsubstituted" means being unsubstituted or substituted with one or more substituents selected from the group consisting of deuterium, a halogen group, a cyano group, a nitro group, a hydroxy group, a carbonyl group, an ester group, an imide group, an amide group, a primary amino group, a carboxy group, a sulfonic acid group, a sulfonamide group, a phosphine oxide group, an alkoxy group, an aryloxy group, an alkylthioxy group, an arylthioxy group, an alkylsulfoxy group, an arylsulfoxy group, a silyl group, a boron group, an alkyl group, a cycloalkyl group, an alkenyl group, an aryl group, an aralkyl group, an aralkenyl group, an alkylaryl group, an alkoxysilylalkyl group, an arylphosphine group, or a heterocyclic group containing at least one of N, O and S atoms, or being unsubstituted or substituted with a substituent in which two or more substituents are linked among the substituents exemplified above. For example, "the substituent in which two or more substituents are connected" can be a biphenyl group. Namely, the biphenyl group can also be an aryl group, and can be interpreted as a substituent in which two phenyl groups are connected.

As used herein, the notation

or ——* means a bond linked to another substituent group.

As used herein, aromatic is a characteristic that satisfies Huckel's rule, and a compound can be said to be aromatic if it satisfies all of the following three conditions according to Huckel's rule.

1) There must exist 4n+2 electrons which are fully conjugated by vacant p-orbital, unsaturated bond, unpaired electron pair, and so on.
2) 4n+2 electrons must constitute a planar isomer and form a ring structure.
3) All atoms in the ring must be able to participate in the conjugation.

As used herein, a compound can be defined as aliphatic if it does not meet the above-mentioned aromatic requirements.

As used herein, an alkyl group is a monovalent functional group derived from an alkane, and can be linear or branched, and the carbon number of the linear alkyl group is not particularly limited, but preferably 1 to 20. Also, the carbon number of the branched alkyl group is 3 to 20. Specific examples of the alkyl group can include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, 2,6-dimethylheptan-4-yl, and the like, but are not limited thereto. The alkyl group can be substituted or unsubstituted, and if substituted, examples of the substituent are as described above.

As used herein, a cycloalkyl group is a monovalent functional group derived from a cycloalkane, which can be monocyclic or polycyclic, and is not particularly limited, but the carbon number thereof can be 3 to 20. According to another exemplary embodiment, the carbon number of the cycloalkyl group is 3 to 10. Specific examples include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, bicyclo[2,2,1]heptyl, and like, but are not limited thereto. The cycloalkyl group can be substituted or unsubstituted, and if substituted, examples of the substituent are as described above.

As used herein, an aryl group is a monovalent functional group derived from an arene, and is not particularly limited, but the carbon number thereof is preferably 6 to 20, and it can be a monocyclic aryl group or a polycyclic aryl group. The aryl group can be a phenyl group, a biphenyl group, a terphenyl group or the like as the monocyclic aryl group, but is not limited thereto. The polycyclic aryl group includes a naphthyl group, an anthracenyl group, a phenanthrenyl group, a pyrenyl group, a perylenyl group, a chrysenyl group, or the like, but is not limited thereto. The aryl group can be substituted or unsubstituted, and if substituted, examples of the substituent are as described above.

As used herein, an alkylene group is a bivalent functional group derived from an alkane, and the description of the alkyl group as defined above can be applied except that it is a divalent functional group. For example, the alkylene group is linear or a branched, and can include methylene group, ethylene group, propylene group, isobutylene group, sec-butylene group, tert-butylene group, pentylene group, hexylene group, or the like. The alkylene group can be substituted or unsubstituted, and if substituted, examples of the substituent are as described above.

As used herein, an arylene group is a bivalent functional group derived from an arene, and the description of the aryl group as defined above can be applied, except that it is a divalent functional group. For example, it can be a phenylene group, a biphenylene group, a terphenylene group, a naphthalene group, a fluorenyl group, a pyrenyl group, a phenanthrenyl group, a perylene group, a tetracenyl group, an anthracenyl group, or the like. The arylene group can be substituted or unsubstituted, and if substituted, examples of the substituent are as described above.

As used herein, a cycloalkylene group is a bivalent functional group derived from a cycloalkane, and the description of the cycloalkyl group as defined above can be applied, except that it is a divalent functional group. The cycloalkylene group can be substituted or unsubstituted, and if substituted, examples of the substituent are as described above.

As used herein, a derivative compound means a compound that has been changed within the limit of not significantly changing the structure and properties of a matrix such as introduction of a functional group, oxidation, reduction, or substitution of atoms when an organic compound is used as a matrix.

Below, the present invention will be described in more detail.

1. Poly(Ether Ester) Copolymer

According to one embodiment of the present invention, provided is a poly(ether ester) copolymer comprising: a polymer matrix containing a polyether-based repeating unit and a polyester-based repeating unit; and a mono-metallic salt of an inorganic acid and a multi-metallic salt of an inorganic acid that remain in the polymer matrix.

The present inventors have found through experiments that similarly to the poly(ether ester) copolymer of one embodiment, a mono-metallic salt of an inorganic acid and a multi-metallic salt of an inorganic acid are added as cocatalysts during the synthesis of the poly(ether ester) copolymer, thereby capable of improving the production efficiency of the poly(ether ester) copolymer and maintaining excellent physical properties, and completed the invention.

The mono-metallic salt of the inorganic acid and the multi-metallic salt of the inorganic acid can be added as cocatalysts together with diol monomers, dicarboxylic acids or derivatives thereof, and polyether diols, and a main catalyst in the process of synthesizing the poly(ether ester) copolymer, and some or all thereof can remain in the finally synthesized poly(ether ester) copolymer.

Specifically, the poly(ether ester) copolymer can include a polymer matrix including a polyether-based repeating unit and a polyester-based repeating unit.

The polyether-based repeating unit means a repeating unit containing a polyether functional group in the repeating unit structure, and can specifically have a structure represented by the following Chemical Formula 1:

[Chemical Formula 1]

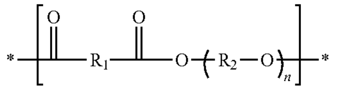

wherein, in Chemical Formula 1, $R_1$ is one of an alkylene group having 1 to 10 carbon atoms, a cycloalkylene group having 3 to 10 carbon atoms, or an arylene group having 6 to 20 carbon atoms, $R_2$ is an alkylene group having 1 to 10 carbon atoms, and n is an integer from 1 to 100.

As a more specific example, in Chemical Formula 1, $R_1$ is a phenylene group, which is an arylene group having 6 carbon atoms, and $R_2$ can be a butylene group that is an alkylene group having 4 carbon atoms.

The polyether-based repeating unit can include a reaction product of a dicarboxylic acid or a derivative thereof and polyether diol, an example of the dicarboxylic acid or its derivative includes terephthalic acid, which is an aromatic dicarboxylic acid, and an example of a polyether diol includes poly(tetramethylene ether)glycol.

The polyester-based repeating unit means a repeating unit containing a polyester functional group in the repeating unit structure, and can specifically have a structure represented by the following Chemical Formula 2:

[Chemical Formula 2]

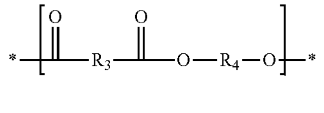

wherein, in Chemical Formula 2, $R_3$ is one of an alkylene group having 1 to 10 carbon atoms, a cycloalkylene group having 3 to 10 carbon atoms, or an arylene group having 6 to 20 carbon atoms, and $R_4$ is an alkylene group having 1 to 10 carbon atoms.

As a more specific example, in Chemical Formula 2, $R_3$ is a phenylene group, which is an arylene group having 6 carbon atoms, and $R_4$ can be a butylene group which is an alkylene group having 4 carbon atoms.

The polyester-based repeating unit can include a reaction product of a dicarboxylic acid or a derivative thereof and a diol, and an example of the dicarboxylic acid or its derivative includes terephthalic acid, which is an aromatic dicarboxylic acid, and an example of the diol includes 1,4-butanediol, which is an aliphatic diol.

The polyether-based repeating unit can constitute a soft segment that provides elasticity and flexibility in the poly (ether ester) copolymer. Additionally, the polyester-based repeating unit can constitute a hard segment that provides mechanical properties in the poly(ether ester) copolymer.

That is, as the polyether ester includes both the polyether-based repeating unit and the polyester-based repeating unit, it consists of a hard segment and a soft segment and thus has elastomer properties.

Meanwhile, the poly(ether ester) copolymer can include a mono-metallic salt of an inorganic acid and a multi-metallic salt of an inorganic acid that remain in the polymer matrix. The mono-metallic salt of the inorganic acid and the multi-metallic salt of the inorganic acid can be added as cocatalysts together with diol monomers, dicarboxylic acids or derivatives thereof, and polyether diols, and a main catalyst in the process of synthesizing the poly(ether ester) copolymer, and some or all thereof can remain in the finally synthesized poly(ether ester) copolymer.

This can be confirmed through inductively coupled plasma (ICP) analysis of the finally synthesized poly(ether ester) copolymer. Specifically, through quantitative analysis of metal elements (e.g., Na and S) using ICP, the presence of two kinds of metallic salt cocatalysts of inorganic acids remaining in the poly(ether ester) copolymer can be confirmed. In addition, the content and ratio of the two kinds of metallic salt cocatalysts of the inorganic acid can be confirmed through ion chromatography analysis or combination analysis of ICP and Ion Chromatography.

The multi-metallic salt of the inorganic acid means a salt obtained by acid-base neutralization reaction between a basic compound containing a metal component and an inorganic acid, and particularly, it refers to a case in which di- or higher metallic components are included in the final salt compound. That is, in the chemical formula of a metallic salt of an inorganic acid, if the number of metal components is two or more, it is defined as a multi-metallic salt of an inorganic acid.

The multi-metallic salt of the inorganic acid can include a di-metallic salt of an inorganic acid, a tri-metallic salt of an inorganic acid, a tetra-metallic salt of an inorganic acid, or a penta-metallic salt of an inorganic acid, depending on the number of metal components.

An example of the di-metallic salt of an inorganic acid among the multi-metallic salt of an inorganic acid includes sodium sulfate ($Na_2SO_4$), sodium hydrogen phosphate ($Na_2HPO_4$), and trisodium phosphate ($Na_3PO_4$).

The multi-metallic salt of the inorganic acid can act as a cocatalyst in the process of synthesizing the poly(ether ester) copolymer, thereby shortening the polymerization time of the poly(ether ester) copolymer.

Further, the mono-metallic salt of the inorganic acid refers to a salt obtained by an acid-base neutralization reaction between a basic compound containing a metal component and an inorganic acid, and particularly refers to a case in which one (mono) metal component is included in the final salt compound. Namely, in the chemical formula of a metallic salt of an inorganic acid, if the number of metal components is one, it is defined as a mono-metallic salt of an inorganic acid. Examples of the mono-metallic salt of the inorganic acid include sodium bisulfate ($NaHSO_4$) and sodium dihydrogen phosphate ($NaH_2PO_4$).

The mono-metallic salt of the inorganic acid acts as a cocatalyst in the process of synthesizing the poly(ether ester) copolymer, and assists in shortening the polymerization time of the poly(ether ester) copolymer by the multi-metallic salt of the inorganic acid, so that polymerization time can be sufficiently shortened even with a smaller amount of multi-metallic salt of an inorganic acid, which can improve the efficiency of the process.

Therefore, when a mono-metallic salt of an inorganic acid and a multi-metallic salt of an inorganic acid are used in combination, a sufficient effect of shortening the polymerization time can be achieved even with a smaller amount of the multi-metallic salt of the inorganic acid due to the mono-metallic salt of the inorganic acid. On the other hand, when only one kind of mono-metallic salt of an inorganic acid is used, there is a problem that the polymerization time of the poly(ether ester) copolymer is increased to more than 140 minutes and the polymerization time is not sufficiently shortened. When only one kind of multi-metallic salt of an inorganic acid is used, an excessive amount of the multi-metallic salt of an inorganic acid must be added to shorten the polymerization time to a sufficient level, which makes it difficult to secure process efficiency.

Specifically, the weight ratio of the multi-metallic salt of the inorganic acid can be 10 parts by weight or more, or 20 parts by weight or more, or 50 parts by weight or more, or 100 parts by weight or more, or 1000 parts by weight or less, or 200 parts by weight or less, or 10 parts by weight to 1000 parts by weight, or 20 parts by weight to 1000 parts by weight, or 50 parts by weight to 1000 parts by weight, or 100 parts by weight to 1000 parts by weight, or 10 parts by weight to 200 parts by weight, or 20 parts by weight to 200 parts by weight, or 50 parts by weight to 200 parts by weight, or 100 parts by weight to 200 parts by weight with respect to 1 part by weight of the mono-metallic salt of the inorganic acid.

When the weight ratio of the multi-metallic salt of an inorganic acid is excessively reduced to less than 10 parts by weight with respect to 1 part by weight of the mono-metallic salt of the inorganic acid, it is difficult to sufficiently realize the effect of shortening the polymerization time of poly (ether ester) copolymers due to the multi-metallic salt of the inorganic acid. When the weight ratio of the multi-metallic salt of the inorganic acid is excessively increased to more than 1000 parts by weight with respect to 1 part by weight of the mono-metallic salt of the inorganic acid, there is a problem that an excessive amount of inorganic acid multi-metallic salt must be added, which makes it difficult to secure process efficiency.

More specifically, the multi-metallic salt of the inorganic acid can be included in an amount of 10 ppm to 10000 ppm, or 10 ppm to 5000 ppm, or 10 ppm to 4000 ppm, or 100 ppm to 10000 ppm, or 100 ppm to 5000 ppm, or 100 ppm to 4000 ppm, or 500 ppm to 10000 ppm, or 500 ppm to 5000 ppm, or 500 ppm to 4000 ppm, or 1000 ppm to 10000 ppm, or 1000 ppm to 5000 ppm, or 1000 ppm to 4000 ppm based on the weight of the poly(ether ester) copolymer.

In addition, the mono-metallic salt of the inorganic acid can be included in an amount of 0.1 ppm to 150 ppm, or 0.1 ppm to 100 ppm, or 0.1 ppm to 80 ppm, or 0.1 ppm to 50 ppm, or 1 ppm to 150 ppm, or 1 ppm to 100 ppm, or 1 ppm to 80 ppm, or 1 ppm to 50 ppm, or 10 ppm to 150 ppm, or 10 ppm to 100 ppm, or 10 ppm to 80 ppm, or 10 ppm to 50 ppm based on the weight of the poly(ether ester) copolymer.

The inorganic acid can include a polyvalent inorganic acid. The polyvalent inorganic acid is a polyprotic acid that can provide more than one hydrogen ion among inorganic acids, and can include a divalent inorganic acid, a trivalent inorganic acid, a tetravalent inorganic acid, a pentavalent inorganic acid, and the like according to the number of hydrogen ions. More specifically, examples of the inorganic acid can include sulfuric acid or phosphoric acid.

The metal can include an alkali metal or an alkaline earth metal, and specific examples of the metal include sodium, potassium, calcium, magnesium, or mixtures thereof.

The poly(ether ester) copolymer can have a yellowness index (YI) of 24 or less, or 23 or less, or 22 or less, or 1 or more, or 1 to 24, or 1 to 23, or 1 to 22, as measured using a color meter. When the yellowness index of the poly(ether ester) copolymer is excessively increased to more than 24 as measured using a color meter, there is a problem that it is difficult to secure a high level of transparency due to excessive yellow discoloration.

The poly(ether ester) copolymer can have a melting point ($T_m$) of 150 °C or more, or 200 °C or more, or 201 °C or more, or 202 °C or more, or 203 °C or more, or 250 °C or less, or 210 °C or less, or 150 °C to 250 °C, or 200 °C to 250 °C, or 201 °C to 250 °C, or 202 °C to 250 °C, or 203 °C to 250 °C, or 200 °C to 210 °C, or 201 °C to 210 °C, or 202 °C to 210 °C, or 203 °C to 210 °C, as measured by differential scanning calorimetry. An example of the differential scanning calorimeter for measuring the melting point includes Differential Scanning calorimetry (device name: DSC 2920, producer: TA Instruments). The melting point can be determined through a temperature-heat flow graph obtained by scanning at a temperature rise rate or a cooling rate of 5 °C/min or more and 15 °C/min or less in the temperature range of 0 °C or more and 250 °C or less. More specifically, the melting point ($T_m$) was obtained through peak analysis of a heating curve of heat flow when the second temperature rises.

When the melting point ($T_m$) of the poly(ether ester) copolymer measured by differential scanning calorimetry is excessively reduced to less than 150 °C, there can be a problem that process efficiency is reduced in the molding process for the poly(ether ester) copolymer.

The poly(ether ester) copolymer can have a crystallization temperature of 70 °C or more, or 151 °C or more, or 152 °C or more, or 153 °C or more, or 154 °C or more, or 155 °C or more, or 156 °C or more, or 200 °C or less, or 160 °C or less, or 70 °C to 200 °C, or 151 °C to 200 °C, or 152 °C to 200 °C, or 153 °C to 200 °C, or 154 °C to 200 °C, or 155 °C to 200 °C, or 156 °C to 200 °C, or 70 °C to 160 °C, or 151 °C to 160 °C, or 152 °C to 160 °C, or 153 °C to 160 °C, or 154 °C to 160 °C, or 155 °C to 160 °C, or 156 °C to 160 °C, as measured by differential scanning calorimetry. Examples of the differential scanning calorimetry for measuring the crystallization temperature include Differential Scanning calorimetry (device name: DSC 2920, producer: TA instruments). The crystallization temperature can be determined through a temperature-heat flow graph obtained by scanning at a temperature rise rate or a cooling rate of 5 °C/min or more and 15 °C/min or less in the temperature range of 0 °C or more and 250 °C or less. More specifically, the crystallization temperature ($T_c$) can be obtained through peak analysis of a cooling curve of heat flow during the first cooling.

When the crystallization temperature of the poly(ether ester) copolymer measured by a differential scanning calorimeter is excessively decreased to less than 70 °C, there is a possibility that the process efficiency is reduced in the molding process for the poly(ether ester) copolymer.

The poly(ether ester) copolymer can have a melt index of 30 g/10 min or less, or 29 g/10 min or less, or 28 g/10 min or less, or 27 g/10 min or less, or 26 g/10 min or less, or 10 g/10 min or more, or 10 g/10 min to 30 g/10 min, or 10 g/10 min to 29 g/10 min, or 10 g/10 min to 28 g/10 min, or 10 g/10 min to 27 g/10 min, or 10 g/10 min to 26 g/10 min as measured in accordance with ASTM D1238 at 230 °C under a load of 2.16 kg. The melt index of a sample obtained by drying the poly(ether ester) copolymer was measured by the same method as ASTM D1238 (holding time of 4 minutes under the presence of a load of 2.16 kg at 230 °C). The drying conditions for the poly(ether ester) copolymer are not particularly limited, but, for example, drying can be performed at a temperature of 50 °C or more and 100 °C or less for 6 hours or more.

The use of the poly(ether ester) copolymer is not particularly limited, and the fields of application of thermoplastic polyester elastomers (TPEE) known hitherto can be introduced without limitation. However, as an example, it can be used for various applications such as automobile parts, automobile interior materials, automobile exterior materials, cables, wires, hoses, tubes, antenna covers, leisure goods, and sporting goods.

Examples of molding processes for application to such uses are not limited, various thermoplastic polyester elastomer (TPEE) molding processes known hitherto can be applied without limitation.

2. Preparation Method of Poly(Ether Ester) Copolymer

According to another embodiment of the invention, provided is a method for preparing a poly(ether ester) copolymer, comprising the steps of: a) an esterification reaction step of reacting a diol, a dicarboxylic acid or a derivative thereof, and a polyether diol in the presence of a catalyst and a cocatalyst: b) a first polycondensation step of introducing the catalyst to the reaction mixture after the step a) is completed and performing polycondensation under reduced pressure to prepare a prepolymer; and c) a second polycondensation step of performing polycondensation of the prepolymer under a lower pressure condition than that of the step b), wherein the cocatalyst includes a monometallic salt of an inorganic acid and a multi-metallic salt of an inorganic acid.

Specifically, the method for preparing a poly(ether ester) copolymer can comprise a) an esterification reaction step of reacting a diol, a dicarboxylic acid or a derivative thereof, and a polyether diol in the presence of a catalyst and a cocatalyst.

In the present invention, the diol is an aliphatic or alicyclic diol having 2 to 10 carbon atoms, and preferably has a molecular weight of 300 g/mol or less from the viewpoint of realizing the effects of the present invention. Specifically, examples of diols that can be used herein include aliphatic diols such as 1,4-butylene glycol (1,4-butanediol), monoethylene glycol, diethylene glycol, propylene glycol and neopentyl glycol; and alicyclic diols such as 1,1-cyclohexanedimethanol, 1,4-cyclohexane dimethanol, and tricyclodecane dimethanol; and the like, but are not limited thereto. Specifically, in the present invention, the diol can be 1,4-butanediol which is an aliphatic diol.

Examples of dicarboxylic acids that can be used herein include terephthalic acid, isophthalic acid, naphthalenedicarboxylic acid, adipic acid, and sebacic acid, but are not limited thereto. Specifically, the dicarboxylic acid can be terephthalic acid. Examples of dicarboxylic acid derivatives that can be used herein include dialkyl terephthalate, dialkyl isophthalate, dialkyl naphthalenedicarboxylate, dialkyl adipic acid ester, and dialkyl sebacic acid ester, but are not limited thereto. Specifically, the dicarboxylic acid or a derivative thereof can be dimethyl terephthalate, which is a derivative of an aromatic dicarboxylic acid.

Polyether diols that can be used herein can be in the form of homopolymers or copolymers, and specific examples thereof can include one or more selected from the group consisting of polytetramethylene glycol, polyethylene glycol, polypropylene glycol, polyethylene glycol-polypropylene glycol-polyethylene glycol, polyhexamethylene glycol, and the like, but are not limited thereto. Specifically, the polyether diol can be polytetramethylene glycol.

In this regard, the number average molecular weight (Mn) of the polyether diol is not particularly limited, but it can be 500 g/mol or more and 3000 g/mol or less, or 500 g/mol or more and 2000 g/mol or less, or 500 g/mol or more and 1500 g/mol or less. The number average molecular weight can be determined by, for example, a gel permeation chromatography (GPC) or end-group titration (a method which comprises acetylating the end group of the polyether diol with acetic anhydride, decomposing the unreacted acetic anhydride to acetic acid, and determining the OH value of the acetylated polyether diol by back titration using an alkali, and determining the number average molecular weight of the polyether diol from the OH value) or an —OH end group analysis method through 1H NMR analysis.

The esterification reaction of reacting the diol, dicarboxylic acid or a derivative thereof, and a polyether diol is performed in the presence of a catalyst (main catalyst) and a cocatalyst, wherein as the catalyst (main catalyst), any material known in the art can be appropriately used. Specifically, the catalyst (main catalyst) can be a catalyst containing titanium or tin as an active metal. More specifically, as the catalyst, titanium-based catalysts such as tetrabutyl titanate (TBT), tetraethyl titanate or tetra(isopropyl) titanate: or tin-based catalysts such as n-butylstannoic acid, octylstannoic acid, dimethyltin oxide, dibutyltin oxide, dioctyltin oxide, diphenyltin oxide, tri-n-butyltin acetate, tri-n-butyltin chloride, or tri-n-butyltin fluoride can be used. Further, in addition to the above-mentioned catalysts, catalysts such as oxides or acetates containing Mg, Ca, Mn, Zn, Pb, Zr and the like as active metals can be used singly or in combination. Among them, a titanium-based catalyst such as TBT can be preferably used.

Meanwhile, in the present invention, the catalyst is introduced in the polycondensation step as well as in the esterification reaction. Generally, when preparing poly(ether ester) copolymers, the catalyst of esterification (or transesterification) and the polycondensation reaction is the same as each other. Since no separation process is included between the two reactions, a predetermined amount of the catalyst is introduced at the beginning of the first esterification (or transesterification) reaction or during the reaction, and then the catalyst may not be further added in the polycondensation step.

The cocatalyst can include a mono-metallic salt of an inorganic acid and a di-metallic salt of an inorganic acid. The multi-metallic salt of the inorganic acid refers to a salt obtained by acid-base neutralization reaction between a basic compound containing a metal component and an inorganic acid, and particularly, it refers to a case in which two (di) or higher metal components are included in the final salt compound. That is, in the chemical formula of a metallic salt of an inorganic acid, if the number of metal components is two or more, it is defined as a multi-metallic salt of an inorganic acid.

The multi-metallic salt of the inorganic acid can include a di-metallic salt of an inorganic acid, a tri-metallic salt of an inorganic acid, a tetra-metallic salt of an inorganic acid, or a penta-metallic salt of an inorganic acid, depending on the number of metal components.

Examples of di-metallic salts of inorganic acids among the multi-metallic salts of inorganic acids include sodium sulfate ($Na_2SO_4$), sodium hydrogen phosphate ($Na_2HPO_4$), and trisodium phosphate ($Na_3PO_4$).

The multi-metallic salt of the inorganic acid can act as a cocatalyst in the process of synthesizing the poly(ether ester) copolymer, and can play a role in shortening the polymerization time of the poly(ether ester) copolymer.

In addition, the multi-metallic salt of the inorganic acid means a salt obtained by an acid-base neutralization reaction between a basic compound containing a metal component and an inorganic acid, and particularly, it refers to a case in which one (mono) metal component is included in the final salt compound. That is, in the chemical formula of the metallic salt of an inorganic acid, if the number of metal components is one, it is defined as a mono-metallic salt of an inorganic acid. An example of the mono-metallic salt of the inorganic acid include sodium bisulfate ($NaHSO_4$) or sodium dihydrogen phosphate ($NaH_2PO_4$).

The mono-metallic salt of the inorganic acid acts as a cocatalyst in the process of synthesizing the poly(ether ester) copolymer, and assists in shortening the polymerization time of the poly(ether ester) copolymer due to the multi-metallic salt of the inorganic acid, so that polymerization time can be sufficiently shortened even with a smaller amount of multi-metallic salt of an inorganic acid, and the efficiency of the process can be improved.

Therefore, when a mono-metallic salt of an inorganic acid and a multi-metallic salt of an inorganic acid are used in combination, a sufficient effect of shortening the polymerization time can be realized even with a smaller amount of multi-metallic salt of an inorganic acid due to the mono-metallic salt of an inorganic acid. On the other hand, when only one kind of mono-metallic salt of an inorganic acid is used, the polymerization time of the poly(ether ester) copolymer increases to more than 140 minutes, which can cause a problem that the polymerization time is not sufficiently shortened. If only one kind of multi-metallic salt of an inorganic acid is used, an excessive amount of multi-metallic salt of an inorganic acid must be added in order to shorten the polymerization time to a sufficient level, there is a problem that it is difficult to secure the efficiency of the process.

Specifically, the weight ratio of the multi-metallic salt of an inorganic acid can be 10 parts by weight or more, or 20 parts by weight or more, or 50 parts by weight or more, or 100 parts by weight or more, or 1000 parts by weight or less, or 200 parts by weight or less, or 10 parts by weight to 1000 parts by weight, or 20 parts by weight to 1000 parts by weight, or 50 parts by weight to 1000 parts by weight, or 100 parts by weight to 1000 parts by weight, or 10 parts by weight to 200 parts by weight, or 20 parts by weight to 200 parts by weight, or 50 parts by weight to 200 parts by weight, or 100 parts by weight to 200 parts by weight with respect to 1 part by weight of the mono-metallic salt of the inorganic acid.

When the weight ratio of the multi-metallic salt of an inorganic acid is excessively reduced to less than 10 parts by weight with respect to 1 part by weight of the mono-metallic salt of the inorganic acid, it is difficult to sufficiently realize the effect of shortening the polymerization time of poly (ether ester) copolymers due to the use of multi-metallic salts of inorganic acids. When the weight ratio of the multi-metallic salt of the inorganic acid is excessively increased to more than 1000 parts by weight with respect to 1 part by weight of the mono-metallic salt of the inorganic acid, there is a problem that an excessive amount of inorganic acid multi-metallic salt must be added, which makes it difficult to secure the efficiency of the process.

More specifically, the multi-metallic salt of the inorganic acid can be included in an amount of 10 ppm to 10000 ppm, or 10 ppm to 5000 ppm, or 10 ppm to 4000 ppm, or 100 ppm to 10000 ppm, or 100 ppm to 5000 ppm, or 100 ppm to 4000 ppm, or 500 ppm to 10000 ppm, or 500 ppm to 5000 ppm, or 500 ppm to 4000 ppm or 1000 ppm to 10000 ppm, or 1000 ppm to 5000 ppm, or 1000 ppm to 4000 ppm based on the weight of the reaction mixture in which the step a) is completed.

In addition, the mono-metallic salt of the inorganic acid can be included in an amount of 0.1 ppm to 150 ppm, or 0.1 ppm to 100 ppm, or 0.1 ppm to 80 ppm, or 0.1 ppm to 50 ppm, or 1 ppm to 150 ppm, or 1 ppm to 100 ppm, or 1 ppm to 80 ppm, or 1 ppm to 50 ppm, or 10 ppm to 150 ppm, or 10 ppm to 100 ppm, or 10 ppm to 80 ppm, or 10 ppm to 50 ppm based on the weight of the reaction mixture at which the step has been completed.

The inorganic acid can include a polyvalent inorganic acid. The polyvalent inorganic acid is a polyprotic acid that can provide more than one hydrogen ion among inorganic acids, and can include divalent inorganic acids, trivalent inorganic acids, tetravalent inorganic acids, pentavalent inorganic acids, etc. according to the number of hydrogen ions. More specifically, examples of the inorganic acid can include sulfuric acid or phosphoric acid.

The metal can include an alkali metal or an alkaline earth metal, and specific examples of the metal include sodium, potassium, calcium, magnesium, or mixtures thereof. Meanwhile, in the present invention, a certain amount of the cocatalyst can be added at the start of the first esterification (or transesterification) reaction, at the initial state of the reaction, or at the end of the reaction, and if necessary, it can be additionally added in the polycondensation step.

The reaction temperature in step a) is preferably in the range of 150 °C or more and 300 °C or less, or 200 °C or more and 240 °C or less, and the reaction pressure can be in the range of 100 torr or more and 760 torr or less. Specifically, after the starting material and the catalyst were added to a reactor, the temperature was raised to 0.1 °C/min or more and 10 °C/min or less under stirring to reach the above temperature range, and then the esterification reaction can be performed for about 30 minutes to 4 hours, or 1 to 2 hours.

When the step a) is completed, the polycondensation steps b) and c) are then performed. The polycondensation step can be performed in a reactor separate from the esterification reactor, and can be performed without a distillation column. Specifically, the polycondensation step is performed after adding a catalyst of 50 ppm or more based on active metal to the reaction mixture after the step a) is completed.

In the present invention, the polycondensation step is divided into two steps b) and c). The steps b) and c) are performed substantially continuously, but there is a difference in pressure conditions. Specifically, step b) is a step of removing excess diol, and the step c) is a step of increasing the viscosity of the poly(ether ester) copolymer.

Specifically, the method for preparing the poly(ether ester) copolymer can comprise b) a first polycondensation step of introducing the catalyst to the reaction mixture after the step a) is completed and performing polycondensation under reduced pressure to prepare a prepolymer.

The step b) of the present invention is a first polycondensation step performed under relatively mild conditions, and is a step of adding a catalyst to the reaction mixture in which the step a) is completed, subjecting the reaction mixture to a polycondensation while stirring with a mechanical stirrer under reduced pressure to obtain a prepolymer.

The step b) can be performed under the conditions of a temperature of 180 °C to 250 °C and a pressure of 5 torr to 100 torr. Under these conditions, excess diol unreacted in the step a) is vaporized and removed. The reaction time of the step b) is not particularly limited, but can be 20 minutes to 1 hour, or 20 minutes to 40 minutes.

If the polycondensation proceeds immediately in a high vacuum of 5 torr or less without performing the step b), vaporization of unreacted diol can occur rapidly to cause a bumping phenomenon in the reactor, and a temperature decrease of the reactant can be intensified. Moreover, there can be a problem that the poly(ether ester) copolymer cannot be obtained with high viscosity. Therefore, in the present invention, the first polycondensation step is preliminarily performed under mild conditions before the full-scale polycondensation reaction.

On the other hand, in the step a) or b), in order to improve the reaction efficiency and adjust the physical properties of the poly(ether ester) copolymer produced, one or more commonly used additives can be added together.

Examples of usable additives include a branching agent for increasing the melt strength of poly(ether ester) copolymers (e.g., glycerol, sorbitol, pentaerythritol, 1,1,4,4-tetrakis (hydroxymethyl)cyclohexane, trimethylol propane, pyromellitic acid, 1,1,2,2-ethanetetracarboxylic acid, etc.), a matting agent for improving color characteristics (e.g. $TiO_2$, zinc sulfide or zinc oxide), a colorant (e.g., dye), a stabilizer (e.g., antioxidant, ultraviolet light stabilizer, heat stabilizer, etc.), a filler, a flame retardant, a pigment, an antimicrobial agent, an antistatic agent, an optical brightener, an extender, a processing aid, a viscosity enhancer, or the like, and any one or a mixture of two or more of these can be mentioned, but is not limited thereto. As an example, in order to increase the thermal stability of the poly(ether ester) copolymer, a stabilizer in the form of hindered phenol (e.g., Irganox 1330) can be added.

These additives can be used in an appropriate amount within the range that secures the desired effect and does not deteriorate the physical properties of the poly(ether ester) copolymer produced. Specifically, the additive can be used in an amount of 0.1 to 10% by weight based on 100% by weight in total of the raw material.

In addition, the method for preparing the poly(ether ester) copolymer can comprise c) a second polycondensation step of performing polycondensation of the prepolymer under a lower pressure condition than that of the step b).

The step c) is a reaction continuing with the step b), and is a step of performing polycondensation of the prepolymer in the same reactor in a state where the pressure is further lowered.

In the step c), the time from a point of time at which the reaction starts to a point of time at which a torque value of the mechanical stirrer reaches 0.8 Nm to stop the reaction can be 100 minutes or less, or 95 minutes or less, or 94 minutes or less, or 90 minutes or less, or 50 minutes or more, or 50 minutes to 100 minutes, or 50 minutes to 95 minutes, or 50 minutes to 94 minutes, or 50 minutes to 90 minutes. In the step c), if the time from a point of time at which the reaction starts to a point of time at which a torque value of the mechanical stirrer reaches 0.8 Nm to stop the reaction increases excessively, there is a problem that it is difficult to sufficiently shorten the polymerization time, and productivity decreases.

The step c) can be performed under the conditions of a temperature of 180 °C to 250 °C and a pressure of 5 torr or less. Under these conditions, polycondensation is performed for about 30 minutes to 5 hours, or 1 to 3 hours, and the reaction is completed when the torque value reaches the range of 0.5 Nm to 2.0 Nm, thereby finally prepare a poly(ether ester) copolymer.

Advantageous Effects

According to the present invention, a poly(ether ester) copolymer that can significantly shorten a polymerization time and increase productivity, while maintaining a state of excellence in physical properties of the copolymer, and a method for preparing the same can be provided.

EXAMPLES

Hereinafter, the present invention will be described in more detail with reference to examples. However, the following examples are for illustrative purposes only, and are not intended to limit the scope of the present invention.

Example, Comparative Example and Reference Example: Preparation of Poly(Ether Ester) Copolymer

Example 1

120 g of terephthalic acid, 200 g of 1,4-butanediol, and 80 g of poly(tetramethylene ether)glycol (PTMG, Mn=1,000), 50 ppm (based on Ti element) of tetrabutyl titanate (TBT) catalyst, and 800 ppm (based on total raw material input) of sodium sulfate ($Na_2SO_4$) and 30 ppm (based on total raw material input) of sodium bisulfate ($NaHSO_4$) as cocatalysts were introduced into to a 2 L glass reactor, and stirred with a mechanical stirrer for 2 hours under a nitrogen atmosphere, and the temperature was raised up to 230 °C, and an esterification (ES) reaction was performed under a pressure of 100 to 760 torr.

After the ES reaction, 50 ppm (based on Ti element) of tetrabutyl titanate (TBT) catalyst and 3000 ppm of Irganox 1330 as an antioxidant were introduced into the reactor, and then stirred for 10 minutes to remove the liquid by-product generated within a Dean-Stark trap. Then, the pressure was reduced to 10 torr in the range of 230 °C for 30 minutes to perform a first polycondensation (PC) reaction.

Then, the second polycondensation (PC) reaction was performed at 240 °C and 1 torr or less. During the PC reaction, the torque value of the mechanical stirrer continuously increased, and after the torque reached 0.8 Nm, the reaction was stopped, pressurized, and discharged into cold water. The product was cooled, and dried to obtain a PBT-PTMG copolymer.

Examples 2 to 3, Comparative Examples 1 to 4, Reference Examples 1 to 2

A PBT-PTMG copolymer was obtained in the same manner as in Example 1, except that the content of 800 ppm (based on the total raw material input) of sodium sulfate ($Na_2SO_4$) and 30 ppm (based on the total raw material input)

of sodium bisulfate ($NaHSO_4$) as the cocatalysts was changed as shown in Table 1 below.

Experimental Example: Measurement of Physical Properties of Poly(Ether Ester) Copolymer The physical properties of the poly(ether ester) copolymers obtained in the Examples and Comparative Examples were measured by the following method, and the results are shown in Table 1 below.

1. Second Polycondensation (PC) Reaction Time (Unit: Minute)

In the Examples and Comparative Examples, the time from a point of time at which the reaction started to a point of time at which a torque value of the mechanical stirrer reached 0.8 Nm to stop the reaction was measured.

2. Melt Index (Unit: g/10 Min)

The poly(ether ester) copolymers obtained in the Examples and Comparative Examples were subjected to vacuum drying in an oven at 60 °C for 6 hours or more, and the melt index was measured by the same method as in ASTM D1238 (holding time of 4 minutes in the presence of a load of 2.16 kg at 230 °C).

3. Melting Point, Crystallization Temperature (Unit: °C)

With respect to the poly(ether ester) copolymers obtained in the Examples and Comparative Examples, the melting point ($T_m$) and crystallization temperature ($T_c$) were measured on a temperature-heat flow graph obtained by scanning twice at a temperature rise rate or a cooling rate of 10 °C/min in the temperature range of 0 °C or more and 250 °C or less using Differential Scanning calorimetry (device name: DSC 2920, producer: TA Instruments).

The crystallization temperature ($T_c$) was obtained through peak analysis of the cooling curve of heat flow during the first cooling, and the melting point ($T_m$) was obtained through peak analysis of the heating curve of heat flow during the second temperature rise.

4. Yellowness Index

The yellowness index of the poly(ether ester) copolymers obtained in the Examples and Comparative Examples were measured using Color meter ZE6000 (NIPPON DENSHOKU).

TABLE 1

Experimental Example Measurement Results of Examples and Comparative Examples

| Category | Cocatalyst $Na_2SO_4$ (ppm) | Cocatalyst $NaHSO_4$ (ppm) | PC reaction time(min) | Melting index (g/10 min) | Melting point (°C) | Crystallization temperature (°C) | Yellowness index |
|---|---|---|---|---|---|---|---|
| Example 1 | 800 | 30 | 95 | 27 | 203 | 156 | 22 |
| Example 2 | 800 | 75 | 94 | 27 | 203 | 152 | 22 |
| Example 3 | 3200 | 30 | 87 | 26 | 203 | 154 | 24 |
| Comparative Example 1 | 800 | 0 | 118 | 24 | 204 | 155 | 23 |
| Comparative Example 2 | 3200 | 0 | 102 | 26 | 204 | 153 | 24 |
| Comparative Example 3 | 0 | 30 | 147 | 22 | 201 | 151 | 24 |
| Comparative Example 4 | 0 | 0 | 114 | 26 | 204 | 151 | 22 |
| Reference Example 1 | 800 | 150 | 140 | 26 | 201 | 154 | 22 |
| Reference Example 2 | 80 | 30 | 127 | 27 | 203 | 156 | 20 |

As shown in Table 1, the poly(ether ester) copolymers of Examples 1 to 3 exhibited the melt index, melting point, crystallization temperature, yellowness index physical properties of levels equivalent to Comparative Examples or Reference Examples, and also exhibited a PC reaction time of 87 to 95 minutes, thereby being able to increase the process efficiency through a short PC reaction time as compared with Comparative Examples 1, 2, 3 and 4 and Reference Examples 1 and 2 having a PC reaction time of 100 minutes or more.

The invention claimed is:

1. A poly(ether ester) copolymer comprising:

a polymer matrix containing a polyether-based repeating unit and a polyester-based repeating unit; and a mono-metallic salt of an inorganic acid and a multi-metallic salt of an inorganic acid that remain in the polymer matrix, wherein the multi-metallic salt of an inorganic acid is sodium sulfate, and the mono-metallic salt of an inorganic acid is sodium bisulfate.

2. The poly(ether ester) copolymer of claim 1, wherein: the poly(ether ester) copolymer has a yellowness index of 24 or less as measured using a color meter.

3. The poly(ether ester) copolymer of claim 1, wherein: the poly(ether ester) copolymer has a melting point of 150 °C or more as measured by a differential scanning calorimeter.

4. The poly(ether ester) copolymer of claim 1, wherein: the poly(ether ester) copolymer has a crystallization temperature of 70 °C or more as measured by a differential scanning calorimeter.

5. The poly(ether ester) copolymer of claim 1, wherein: the multi-metallic salt of an inorganic acid is present at a weight ratio of 10 parts by weight or more with respect to 1 part by weight of the mono-metallic salt of an inorganic acid.

6. The poly(ether ester) copolymer of claim 1, wherein: the multi-metallic salt of an inorganic acid is included in an amount of 10 ppm to 10000 ppm based on the weight of the poly(ether ester) copolymer.

7. The poly(ether ester) copolymer of claim 1, wherein: the mono-metallic salt of an inorganic acid is included in an amount of 0.1 ppm to 150 ppm based on the weight of the poly(ether ester) copolymer.

8. The poly(ether ester) copolymer of claim 1, wherein: the polyether-based repeating unit has a structure represented by the following Chemical Formula 1:

[Chemical Formula 1]

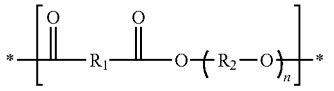

wherein, in Chemical Formula 1:

$R_1$ is one of an alkylene group having 1 to 10 carbon atoms, a cycloalkylene group having 3 to 10 carbon atoms, or an arylene group having 6 to 20 carbon atoms;

$R_2$ is an alkylene group having 1 to 10 carbon atoms; and n is an integer from 1 to 100.

9. The poly(ether ester) copolymer of claim 1, wherein: the polyester-based repeating unit has a structure represented by the following Chemical Formula 2:

[Chemical Formula 2]

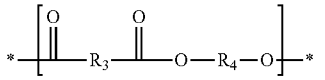

wherein, in Chemical Formula 2:

$R_3$ is one of an alkylene group having 1 to 10 carbon atoms, a cycloalkylene group having 3 to 10 carbon atoms, or an arylene group having 6 to 20 carbon atoms; and $R_4$ is an alkylene group having 1 to 10 carbon atoms.

10. A method for preparing a poly(ether ester) copolymer, comprising the steps of:

a) an esterification reaction step of reacting a diol, a dicarboxylic acid or a derivative thereof, and a polyether diol in the presence of a catalyst and a cocatalyst;

b) a first polycondensation step of introducing the catalyst to the reaction mixture in which the step a) is completed and performing polycondensation under reduced pressure to prepare a prepolymer; and c) a second polycondensation step of performing polycondensation of the prepolymer while mixing with a mechanical stirrer under a lower pressure condition than that of the step b), wherein the cocatalyst includes a mono-metallic salt of an inorganic acid and a multi-metallic salt of an inorganic acid, wherein the multi-metallic salt of an inorganic acid is sodium sulfate, and the mono-metallic salt of an inorganic acid is sodium bisulfate.

11. The method of claim 10, wherein:

in step c), a time from a point of time at which the reaction starts to a point of time at which a torque value of the mechanical stirrer reaches 0.8 Nm to stop the reaction is 100 minutes or less.

12. The method of claim 10, wherein:

the multi-metallic salt of an inorganic acid is present at a weight ratio of 10 parts by weight or more with respect to 1 part by weight of the mono-metallic salt of an inorganic acid.

13. The method of claim 10, wherein:

the multi-metallic salt of an inorganic acid is introduced in an amount of 10 ppm to 10000 ppm based on the weight of the reaction mixture after step a) is completed.

14. The method of claim 10, wherein:

the mono-metallic salt of an inorganic acid is introduced in an amount of 0.1 ppm to 150 ppm based on the weight of the reaction mixture after step a) is completed.

15. The method of claim 10, wherein:

the step b) is performed under conditions of a temperature of 180 °C to 250 °C and a pressure of 5 torr to 100 torr.

16. The method of claim 10, wherein:

the step c) is performed under conditions of a temperature of 180 °C to 250 °C and a pressure of 5 torr or less.

* * * * *